United States Patent
Bylander et al.

(10) Patent No.: US 7,140,950 B1
(45) Date of Patent: Nov. 28, 2006

(54) FIBER POLISHING APPARATUS AND METHOD FOR FIELD TERMINABLE OPTICAL CONNECTORS

(75) Inventors: James R. Bylander, Austin, TX (US); Johnny P. Bryant, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/318,987

(22) Filed: Dec. 27, 2005

(51) Int. Cl.
*B24B 13/00* (2006.01)
(52) U.S. Cl. ............... 451/42; 451/53; 451/391
(58) Field of Classification Search .............. 451/42, 451/41, 53, 391, 390, 386, 384, 55, 365
See application file for complete search history.

(56) References Cited

U.S. PATENT DOCUMENTS

| | | | | |
|---|---|---|---|---|
| 4,457,114 A | * | 7/1984 | Hennenfent et al. | 451/53 |
| 5,018,316 A | * | 5/1991 | Mulholland et al. | 451/364 |
| 5,159,655 A | | 10/1992 | Ziebol et al. | |
| 5,179,608 A | | 1/1993 | Ziebol et al. | |
| 5,201,148 A | * | 4/1993 | Rupert et al. | 451/364 |
| 5,337,390 A | | 8/1994 | Henson et al. | |
| 5,381,498 A | | 1/1995 | Bylander | |
| 5,408,558 A | | 4/1995 | Fan | |
| 5,734,770 A | | 3/1998 | Carpenter et al. | |
| 5,757,997 A | | 5/1998 | Birrell et al. | |
| 5,761,360 A | | 6/1998 | Grois et al. | |
| 5,769,698 A | * | 6/1998 | Chudoba et al. | 451/386 |
| 5,812,718 A | | 9/1998 | Carpenter et al. | |
| 5,855,503 A | | 1/1999 | Csipkes et al. | |
| 5,863,242 A | * | 1/1999 | Waldron et al. | 451/390 |
| 5,904,614 A | | 5/1999 | King | |
| 6,106,368 A | | 8/2000 | Childers et al. | |
| 6,846,111 B1 | | 1/2005 | Otsu et al. | |

| | | | |
|---|---|---|---|
| 2003/0139118 A1 | | 7/2003 | Wetenkamp et al. |

FOREIGN PATENT DOCUMENTS

| | | | | |
|---|---|---|---|---|
| EP | 0 262 770 A1 | | 4/1988 | |
| GB | 2 158 750 A | | 11/1985 | |
| SU | 837783 | * | 6/1981 | 451/42 |
| WO | WO02/056060 A2 | | 7/2002 | |

OTHER PUBLICATIONS

U.S. Appl. No. 10/988,816, filed Nov. 15, 2004, entitled "Fiber Polishing Apparatus and Method for Field Terminable Optical Connectors".
Instruction Manual, "3M Crimplok™ ST* and SC Non-Adhesive Fiber Optic Single & Multi-mode Connectors"; 3M Telecom Systems Division, Austin, TX (Feb. 1999); 26 pgs.
Information Sheet, "Singlemode Fiber Connector—Endface Workmanship"; ADC Telecommunications, Inc. (Oct. 2002); No. 1228830; 5 pgs.
Product Brochure, "LightCrimp Connectors", AMP Netconnect; Tyco Electronics Corp. (Oct. 28, 2004); 2 pgs.

(Continued)

*Primary Examiner*—Robert A. Rose
(74) *Attorney, Agent, or Firm*—Gregg H. Rosenblatt

(57) ABSTRACT

A method of polishing a remote grip optical connector comprises providing an optical fiber having a stripped terminal end. The fiber is inserted through a connector body and ferrule, where the connector body has a gripping region. The optical fiber is secured in the gripping region of the connector body. The connector is heated to heat the optical fiber and the ferrule to an elevated temperature and the heated terminal end of the optical fiber is polished flush with the heated end face of the ferrule.

15 Claims, 5 Drawing Sheets

OTHER PUBLICATIONS

Vander Ploeg, T., & Steiner, R.; "Mechanical or Adhesive? Choosing the Best Fiber Connector for Every Installation"; Technical Paper, Leviton Voice and Data Division, Bothell, WA [on line]; [retrieved from the internet on Nov. 3, 2005], 3 pgs.; URL <http://www.levitonvoicedata.com/learning/documents/FiberConnectorsWhitePaper.pdf>.

"SC Thread-Lock® Connector Assembly Instructions"; Instruction Manual, Leviton Voice and Data Division, Bothell, WA [on line]; [retrieved from the internet on Nov. 3, 2005], 10 pgs.; URL <http://www.levitonvoicedata.com/support/documents/instructionsheets/49884SSC.pdf>.

* cited by examiner

FIBER POLISHING APPARATUS AND METHOD FOR FIELD TERMINABLE OPTICAL CONNECTORS

BACKGROUND OF THE INVENTION

1. Field of the Invention

The present invention is directed to an apparatus and method for polishing terminated optical fiber connectors, in particular, remote grip ferrule-based optical connectors.

2. Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the tip of the ferrule by adhesively securing the fiber within the bore of the ferrule. Another class of connectors includes non-ferrule connectors, which rely on the buckling of a length of fiber to create contact pressure. Another class of connectors includes remote grip (ferruled) connectors, where the fiber is secured at some distance away from the terminal end or tip of the fiber.

When installing a remote grip connector in the field, one current practice uses a coplanar/flush polish. In remote grip connectors, as with other connector types, low optical losses and minimal reflections are achieved when the terminal ends of at least two optical fibers make secure physical contact. However, any differences in the coefficient of expansion between the fiber and the ferrule assembly may result in a non-contacting fiber tip when the temperature is raised, or lowered. The resulting gap can lead to significant reflection. A conventional remote grip connector is described in U.S. Pat. No. 5,408,558.

Another current practice involves a technician performing a field polish to create a fiber terminal end which protrudes beyond the ferrule tip. This method of polishing remote grip connectors produces a range of protrusions that provide a secure physical contact while avoiding excess force on the fiber tips. This method, when conscientiously followed, is sufficient to allow sufficient physical contact of the at least two fiber terminal end faces at temperatures for indoor applications (0° C.–60° C.). However, the conventionally polished field-terminated remote grip connector may not be recommended for outdoor use, which has more stringent temperature requirements (−40° C. to 80° C.). Factors leading to unacceptable optical loss may result from the intrinsic variability of the field polishing process, craftsman error, over polishing (e.g. using too much force or too many strokes and coarse, clogged or contaminated abrasive) or substitution of a different type of abrasive.

SUMMARY OF THE INVENTION

According to an exemplary aspect of the present invention, a method of polishing a remote grip optical connector comprises providing an optical fiber having a stripped terminal end. The fiber is inserted through the connector body and ferrule of the optical connector, where the connector body includes a gripping region. The optical fiber is secured in the gripping region of the connector body. The connector is heated to heat the optical fiber and the ferrule to a temperature above the highest anticipated operating temperature and the heated terminal end of the optical fiber is polished flush with the heated end face of the ferrule.

According to another exemplary aspect of the present invention, a polishing apparatus for polishing the optical fiber connector is provided. The polishing apparatus includes a heatable connector mount to receive an optical fiber connector, a heatable platen supporting the connector mount, and a thermally insulating puck to hold the platen during polishing.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
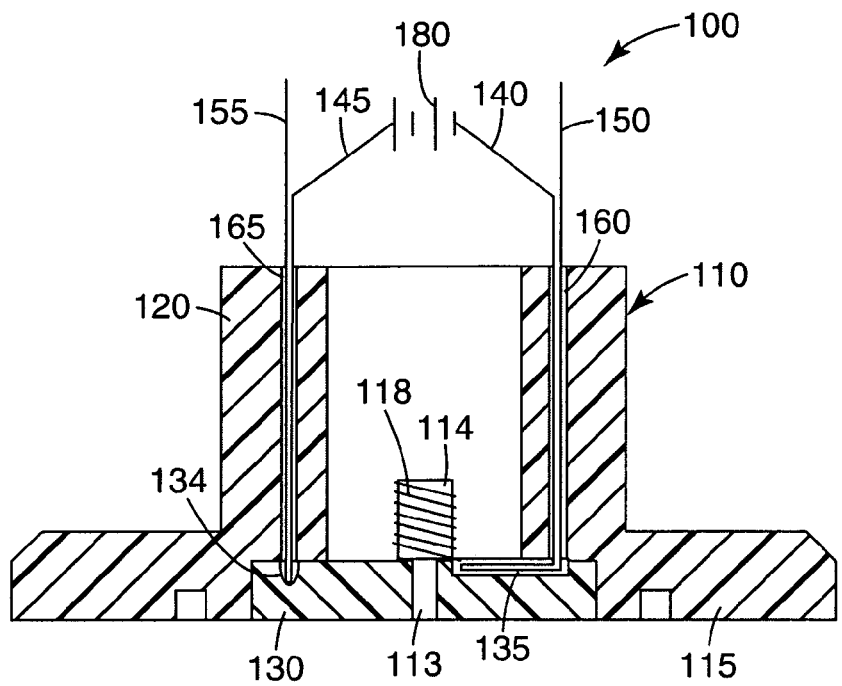
FIG. 1 shows a schematic view of a polishing apparatus according to an exemplary embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an apparatus and method for polishing terminated optical fiber connectors, in particular, remote grip ferrule-based optical connectors. By "remote grip" optical connectors, it is meant that the optical fiber is secured at least 0.1 inch from the ferrule end face. At temperature extremes, thermal expansion coefficient mismatches between the optical fiber and the connector components can result in a loss of contact between the terminal ends of the at least two optical fibers. More precise control of the fiber protrusion length is required in order to meet outdoor performance specifications. As described herein, a simple method of field polishing and assembly of a remote grip optical connector is provided that can substantially reduce the craft sensitivity, when contrasted with traditional field polishing methods, and can reduce connector costs.

FIGS. 1–4 illustrate different schematic views of an exemplary embodiment of the present invention, a polishing apparatus 100. Polishing apparatus 100 includes a polishing puck 110 having a base portion 115 and a gripping portion 120, and a heatable platen 130. Polishing puck 110 can be constructed from a rigid material, such as a metal or a molded polymer (e.g., glass or mineral filled plastic). The shape of polishing puck 110 can be any convenient shape, for example, a structure having a circular base, which can remain substantially flat on a polishing media or surface during the polishing process.

Figure 2A:
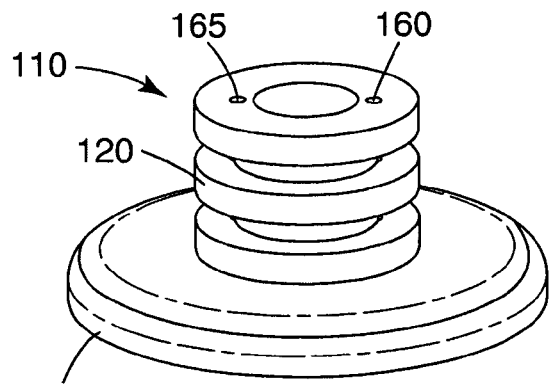
FIGS. 2A and 2B show isometric top and bottom views of the insulating portion of the exemplary polishing apparatus of FIG. 1.
Figure 2B:
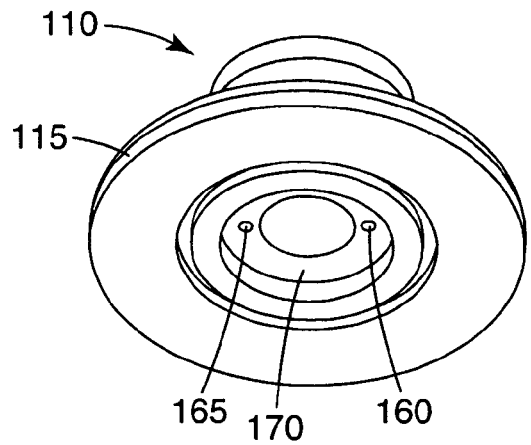

FIGS. 2A and 2B show two isometric views of polishing puck 110. FIG. 2A shows a top view of the puck 110 having a gripping portion 120, a circular base 115 and the top of passageways (e.g., holes) 160, 165 that can extend through puck 110. FIG. 2B shows a bottom view of the puck 110 having a circular base 1115, a inset portion 170 for seating the heatable platen (not shown) therein, and the bottom of passageways 160, 165 that extend through puck 110.

Figure 5:
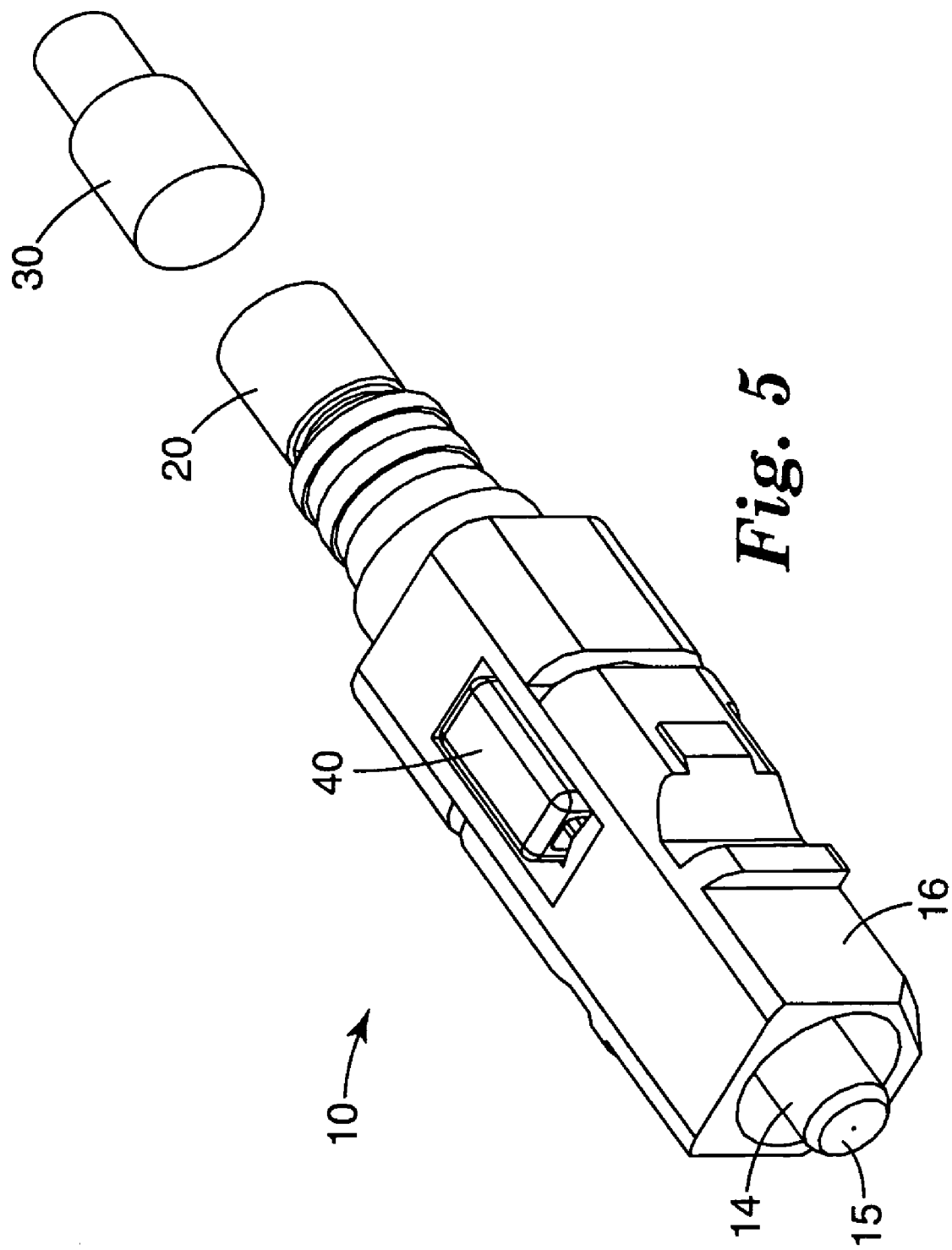
FIG. 5 shows a schematic view of a remote grip optical connector.

Polishing puck 110 further includes a heatable connector mount 114 mounted on the platen 130 that is configured to receive a remote grip connector 10 (see e.g. FIG. 5), such as a Crimplok™ Connector available from 3M Company (St. Paul, Minn.), having a fiber connector housing 16 and having an optical fiber terminated in the connector ferrule 14.

Figure 3:
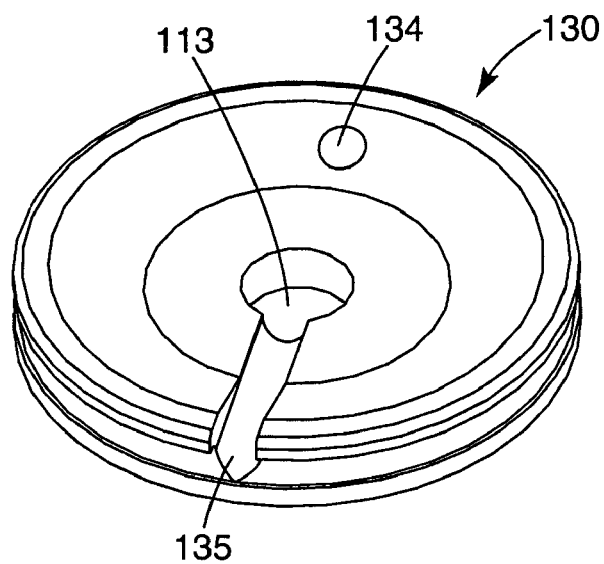
FIG. 3 shows an isometric view of an exemplary heatable platen.
Figure 4:
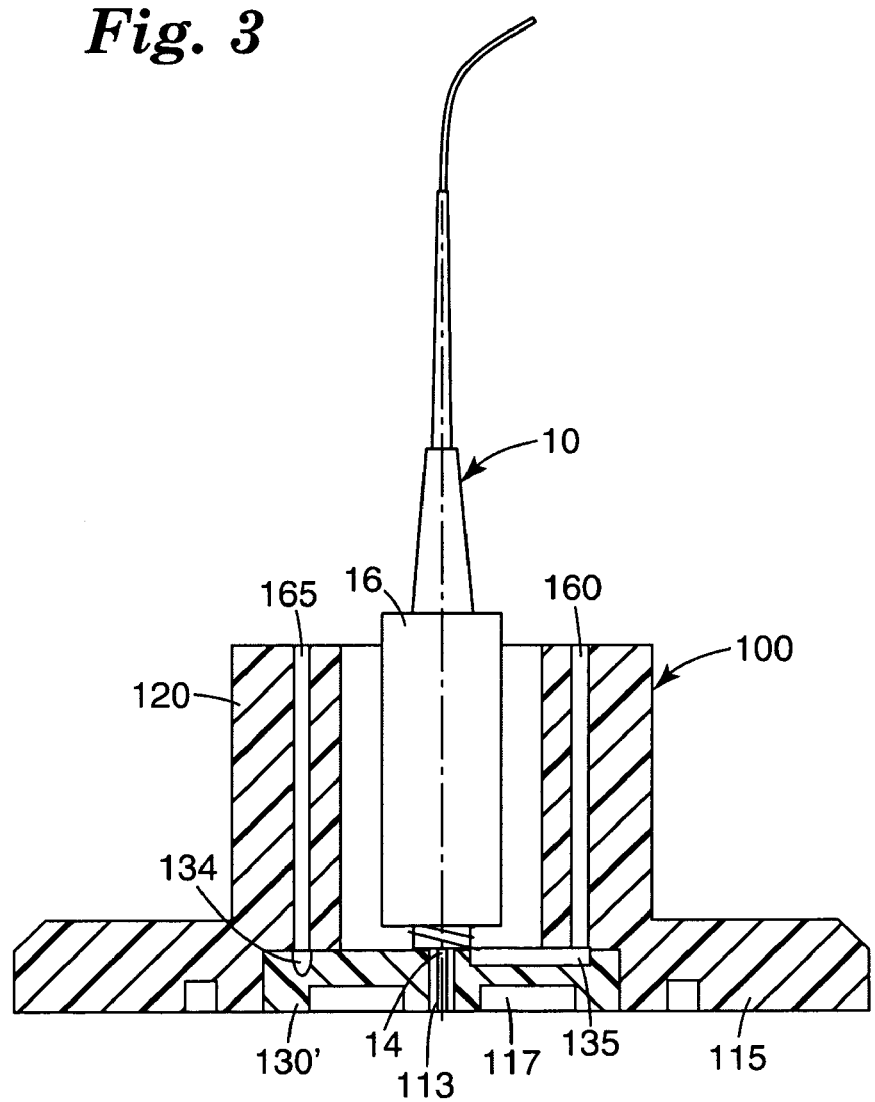
FIG. 4 shows a schematic view of a polishing apparatus having an exemplary optical connector mounted therein according to another embodiment of the present invention.

FIG. 3 shows a schematic view of the top of a heatable platen for a polishing apparatus according to the embodiment of FIG. 1. The heatable platen can be secured in the indented portion of puck 110 by, e.g., a mechanical connection, a resistance fit, a high temperature adhesive, a snap-fit or the like. The heatable platen includes a hole or aperture 113 in a central portion to allow the ferrule of a connector to pass therethrough. The platen may also have at least one channel 135 extending from the aperture to the outside edge of the platen for routing electrical leads and/or thermocouples. Alternatively, the platen may have a well 134 formed in the top surface there of such that it will align with one of the passageways 160, 165 in puck 110 (see FIG. 1) to allow the securing of a second electrical lead 145 and/or a second thermocouple 155. The bottom of the heatable platen may be flat 130 (see FIG. 1) or may be grooved (see platen 130' in FIG. 4).

Connector mount 114 is supported on and secured to the heatable platen 130. Mount 114 can be configured to receive ferrule 14 to provide a snug, slideable fit to hold connector 10 at a predetermined angle, e.g., a flat polish that is perpendicular to the longitudinal direction of the fiber or an angled polish that is at a small angle from perpendicular (about 5° to about 12°). The mount can be resistively heated through passing a current through a wire that is wrapped around the connector mount 114. A suitable wire for wrapping the connector mount may be made of copper, NiChrome (such as a Nickel Chrome alloy of 4.09 Ohms/ft) or any other suitable material. For example, the wire can be connected to the connector mount at the top edge by a spot weld, solder, a high temperature electrically conductive adhesive or the like.

The wire wraps are connected to a power source 180 by a first lead 140 which is connected at one end to the wire 118 that wraps the connector mount 114 at the bottom edge of the mount. The first lead can be disposed in a guide channel 135 in the heatable platen 130. The guide channel 135 can extend from the lower edge of the connector mount 114 to a first passageway 160 that extends through puck 110. The electrical connection is completed by a second lead 145 that is coupled from the power source 180 through a second passageway 165 disposed in the puck 110 to a well 134 in the platen 130.

Also, referring to FIG. 1, one or more thermocouples (e.g., thermocouples 150, 155) can be used to monitor the temperature of the heated connector mount and platen, respectively. For example, the first thermocouple 150 can monitor the temperature of the connector mount. The thermocouple 150 can be preferably disposed at the lower edge of the connector mount and can extend through the puck 110 adjacent to the first lead through the guide channel in the platen. The thermocouple can be connected to a meter (not shown) that provides a temperature reading. The second thermocouple 155 monitors the temperature of the heatable platen and can be positioned in the well 134 adjacent to the second lead. The second thermocouple 155 passes through the second passageway through the puck and on to a meter (not shown). The first lead and first thermocouple may be secured in the guide channel by e.g., a high temperature adhesive or the like. The second lead and second thermocouple may be attached in the well 134 in the heatable platen by e.g., solder, a high temperature conductive adhesive or the like.

A thin layer of electrical/thermal insulating material (not shown) may be placed over top of the wire wraps on the connector mount to hold the wire wraps in place. A thin ceramic layer may be further placed on top of the thin insulating layer to provide further electrical insulation and to stabilize the coil of wire wraps on the connector mount. Other heating elements may be used in place of the wire wrap configuration described herein and may include ceramic heaters, thin film resistive heater and the like. Additionally, the use of an external heat source may also be used in place of an integral heat source. The power source can be a conventional power source that supplies appropriate energy to the heater, such as the lighter receptacle in a vehicle or a battery, preferably a 9V alkali or rechargeable battery.

When in use, a terminated remote grip optical fiber connector 10 is placed in mount 114, so that a portion of ferrule 14 of the optical fiber connector 10 extends through aperture 113 of the heatable platen 130. The base 115 of puck 110 can then be moved or slid across an appropriate polishing media (not shown) so that the fiber and ferrule end face 15 is suitably polished (e.g., flat or angled). With this technique, the craftsperson may polish the fiber so that it is coplanar with the end face of the ferrule, thus simplifying the polishing process.

By conducting the polishing of the connector at a temperature greater than the upper use temperature (i.e. greater than about 85° C., more preferably greater than about 110° C.) and polishing the fiber/ferrule coplanar, the fiber protrusion from the end face of the ferrule can be controlled. For example, the user can rely on the coefficient of thermal expansion of the fiber and connector components, as opposed to relying only on the polishing skill of the craftsman. This heating method provides for a more reproducible setting of the fiber protrusion, thus allowing the use of remote grip optical connectors in more diverse temperature conditions than previously recommended (e.g. for outdoor applications requiring optical performance from −40° C. to 85° C.).

In accordance with one aspect, power can be removed from the connector mount and/or heated platen during polishing. Alternatively, the apparatus can remain attached to the power source during polishing. In a further alternative, a heated polishing platform may be used to help maintain a constant polishing temperature.

As mentioned above, FIG. 5 shows an exemplary remote grip optical fiber connector 10 that includes a connector housing 16. Connector 10 further includes a fiber gripping portion 40 which includes a fiber gripping element positioned inside the connector body (and thus not shown) and a crimping cap that slides onto and actuates the gripping element. Connector 10 further includes a ferrule 14 disposed at one end of the connector housing 16 and a compressible sleeve 20 disposed at the other end of the connector housing 16. Both the connector and ferrule have a bore in the longitudinal direction. These bores are aligned when the ferrule is joined to the connector body to allow the passage of an optical fiber therethrough. Connector 10 is a remote grip connector, where the fiber is secured at a distance of about 0.1 inch or greater from the end face of the ferrule 14. Connector 10 further includes a crimp ring 30 that slides over the sleeve to secure the strength members of the optical fiber cable to the connector and a strain relief boot (not shown) that controls the bend radius of the optical fiber as it exits the connector. An exemplary connector is described in U.S. Pat. No. 5,337,390 and is herein incorporated by reference.

Figure 6:
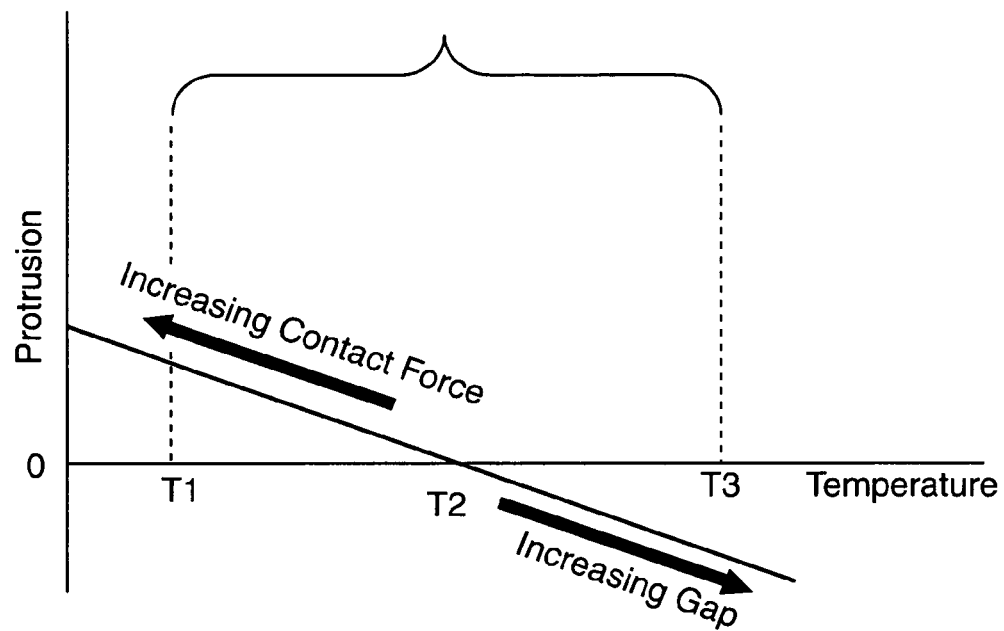
FIG. 6 shows a representation of the amount of protrusion generated as a function of temperature by a room temperature flush polishing of a remote grip connector.
Figure 7:
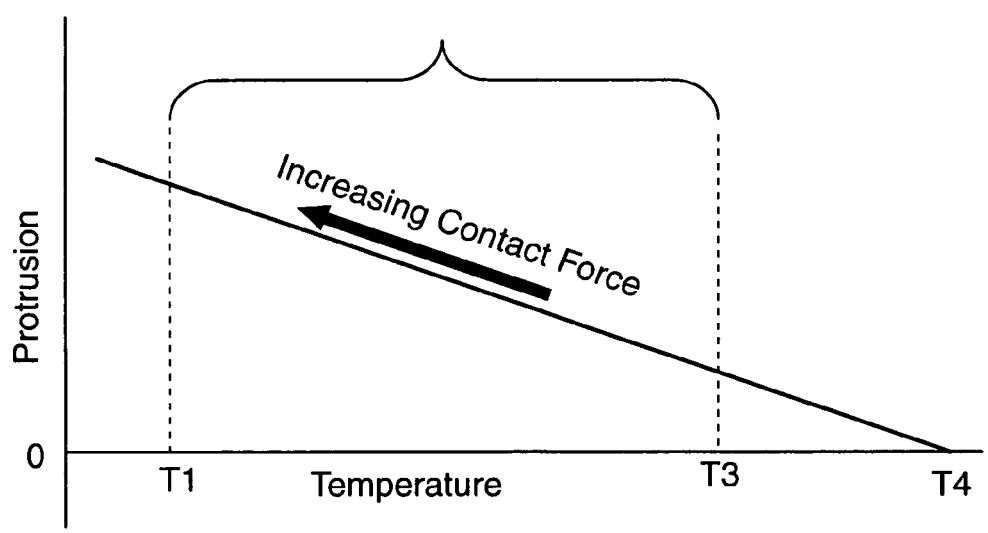
FIG. 7 shows a representation of the amount of protrusion generated as a function of temperature by an elevated temperature flush polishing of a remote grip connector.

FIGS. 6 and 7 illustrate the fiber protrusion as a function of temperature for remote grip connectors, where the coefficient of thermal expansion for the ferrule assembly is greater than that of the fiber. FIG. 6 shows the case of a connector that is flush polished at a temperature, T2, near the center of the operating temperature range, T1–T3. Because the ceramic ferrule generally has a higher thermal expansion coefficient than the optical fiber, this results in low contact forces due to small fiber protrusions at temperatures below the polishing temperature and a gap at higher temperatures where the end face of the fiber has retracted into the ferrule. FIG. 7 shows the case of a connector that is flush polished at a temperature, T4, that is greater that the upper temperature T3 of the operating temperature range, T1–T3. The method of the present invention h provides sufficient force to assure secure physical contact over the intended temperature range because the fiber protrudes from the end face of the ferrule a sufficient amount.

EXAMPLES

A polishing-yield comparison test was performed on three groups of remote grip optical connectors (Crimplok™ SC connector) having terminated fibers available from 3M Company, St. Paul Minn. General assembly tools and instructions for assembling a Crimplok™ SC connector can be found in the 3M™ Crimplok™ 6955 Field termination kit, also available from 3M Company.

A strain relief boot and a crimp ring (see e.g., FIG. 5) were threaded onto the fiber. The connector was seated in the actuation tool. Lengths of optical fiber cable were prepared by removing a terminal portion (~2.25 in.) of the cable jacket. The fiber was then stripped of its buffer coating such that the buffer coating extended ~0.5 inch beyond the cable jacket. The fiber was inserted into the connector until the cable jacket bottoms out in the connector, causing the fiber to form a gentle bend against the actuation tool.

A crimping tool was used to compress a sleeve around the fiber jacket to secure the fiber cable in place. Next, the actuation tool was used to press the crimp element cap into place such causing the crimp element to close around the bare glass fiber behind the connector ferrule. The Kevlar™ strength members were trimmed to a desired length. The Kevlar fibers were fanned out around the connector and the crimp ring was slid forward until it seated against the backend of the connector. The crimp ring was crushed into the strength members and the strain relief boot slid into place to complete assembly of the connector. An excess length of fiber was removed to prepare the connector for polishing.

The exemplary polishing apparatus and method of the present invention was used to prepare a first set of connectors. The prepared connectors, described above, were inserted in a polishing apparatus configured similar to that described with respect to FIGS. 1–4. Power was introduced to the connector mount through the first and second leads until a desired temperature of the connector mount and heatable platen were reached (e.g. 80° C., 120° C., and 140° C.). The power source used was a 9V battery. After reaching the desired temperature, the polishing apparatus was disconnected from the heat source. The connector was polished on a 2 µm 3M™ Imperial lapping film on a polishing platform until the fiber was coplanar with the end face of the ferrule (e.g. approximately 5 seconds of light polishing and 15 seconds of vigorous polishing).

The length of fiber protruding from the end face of the ferrule was measured using a microscope with a position readout including the following steps:

1. Focusing on the end of the fiber tip (5 to 10 microns from the fiber edge) and recording the vertical position of the stage.
2. Focusing on the ferrule face adjacent the fiber at a location close to the point where the first reading was taken and recording a second vertical position of the stage.
3. Subtract one vertical positional reading from the other reading to yield the length of fiber protruding from the end face of the ferrule.

Figure 8:
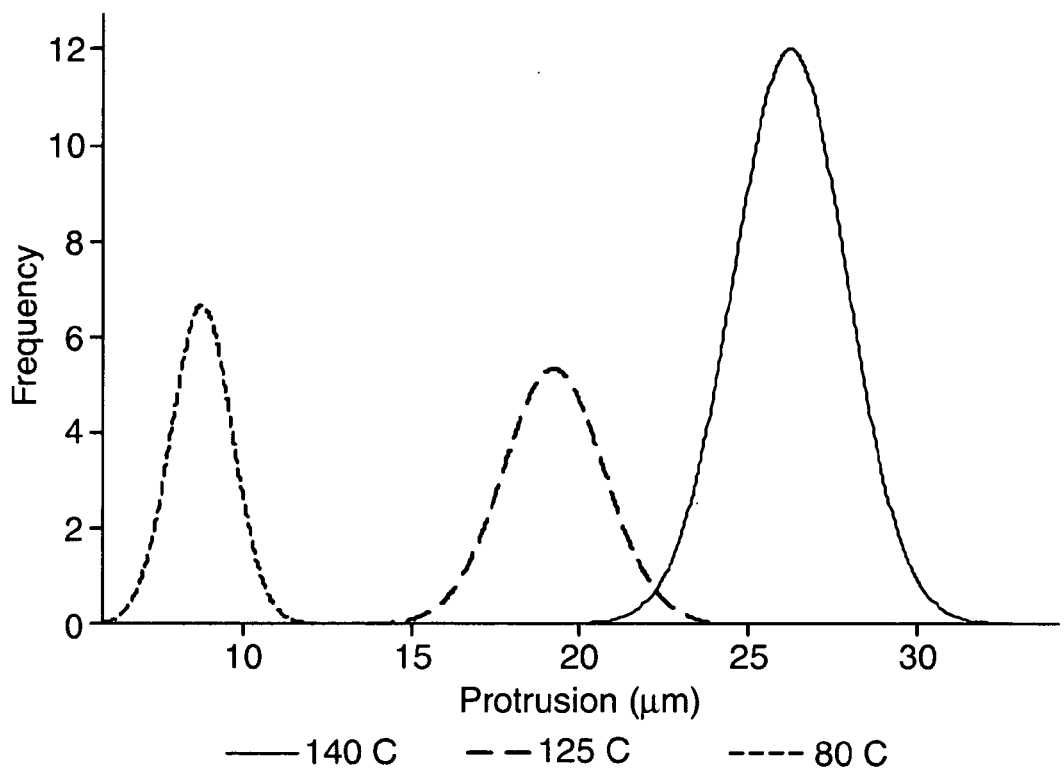
FIG. 8 shows a plot of the protrusion distance distribution using a first exemplary polishing process.

FIG. 8 summarizes the results of these experiments. The leftmost distribution shown in FIG. 8 by the short dash line is a result of using the exemplary apparatus and method of this application with the heater temperature of 80° C. The exemplary hot polishing process using 80° C. as the heater temperature yielded a fiber protrusion of 8.8±0.9 µm. The center distribution of FIG. 8 (long dash line) was made with a heater temperature of 125° C., resulting in an average fiber protrusion of 19.3±1.5 µm. The rightmost distribution of FIG. 8 (solid line) was made with a heater temperature of 140° C. with an average a fiber protrusion of 26.3±1.7 µm.

Because the amount of fiber protrusion can be controlled using the polishing process described herein, a remote grip connector can be prepared by polishing at elevated temperature (i.e. 125° C. and 140° C.) that provides stable optical performance in applications requiring a typical outdoor temperature range (e.g. from about −40° C. to about 80° C.). By using a single step angle polish in conjunction with this method, high performance and stability can result from an installation process with greatly reduced craft sensitivity.

An alternative exemplary method of hot polishing remote grip connectors can include the use of an external heat source, such as a 6312 hot melt oven (120V) available from 3M Company (St. Paul, Minn.) which is traditionally used to install a hot melt adhesive connector onto an optical fiber in the field. In this exemplary hot polishing process, the remote connectors are mounted on the optical fibers as described previously. Once assembled, the connectors are placed in the oven's load adapters and placed in the oven. The connectors can be allowed to reach an oven equilibrium temperature of at least about 200° C.

The connectors were removed from load adapter and placed in the polishing puck. Once the connector was properly seated in the puck, the connectors were polished on a 2 μm 3M™ Imperial lapping film for a specified amount of time (e.g., 20 sec., 30 sec., and 70 sec.) measured from the time the connector was removed from the load adapter. In all cases the polishing time allotted was sufficient to assure that the fiber tip was substantially flush with the ferrule tip at the completion of polishing. In these examples, the amount of fiber protrusion is controlled by the time over which the connector is polished as it cools to the ambient temperature.

Figure 9:
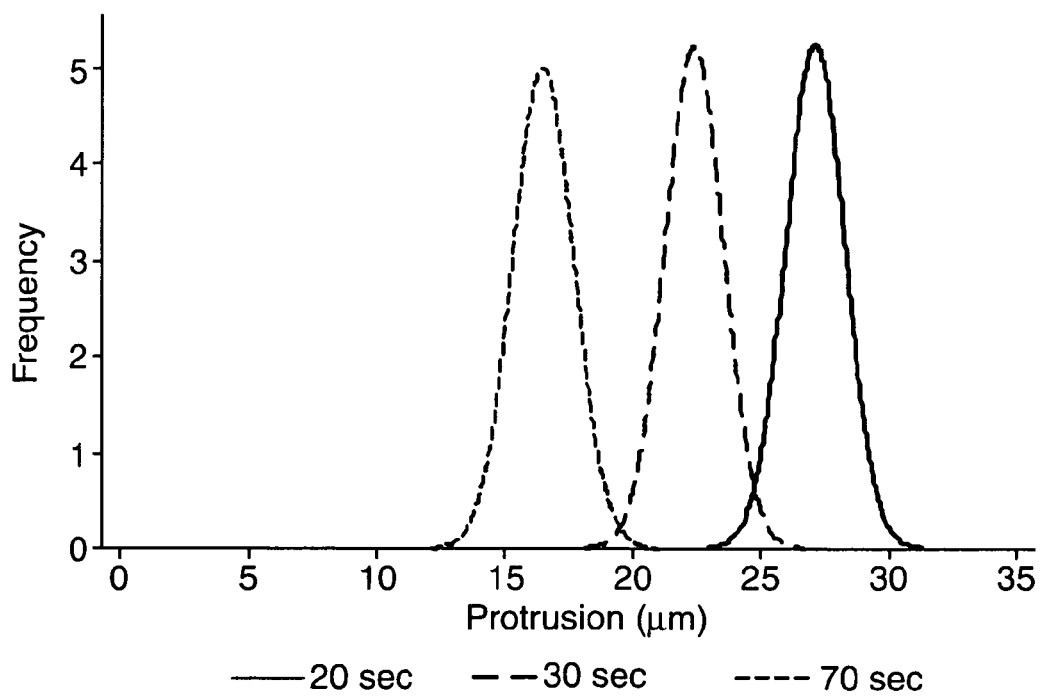
FIG. 9 shows a plot of the protrusion distance distribution using a second exemplary polishing process.

FIG. 9 shows the protrusion distributions for connectors polished according to this oven-based exemplary process for three different polish stopping times (20 sec., 30 sec., and 70 sec.). The data shows that the protrusion length of the fiber extending from the ferrule end face can be adjusted according to the length of time the connector is polished after removal from the external heat source—e.g. with polishing completed at about 20 seconds after removal, a protrusion of 27.1±1.1 μm was observed; with polishing completed at about 30 seconds after removal, a protrusion of 22.4±1.1 μm was observed; and with polishing completed at about 70 seconds after removal, a protrusion of 16.5±1.2 μm. One advantage of this alternative process is that it can utilize equipment that is regularly carried on service trucks when they are sent into the field.

While the invention has been described with respect to a single fiber remote grip connector using a mechanical fiber grip, the apparatus and method described herein may be used with a multi-fiber remote grip connector (e.g. a multi-fiber MT-type remote grip connector), and/or a remote adhesive grip, as would be apparent to one of ordinary skill in the art given the present description.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method of polishing a remote grip optical connector comprising:
   providing an optical fiber having a stripped terminal end;
   inserting the fiber through a connector body and a ferrule, wherein the connector body has a gripping region and the ferrule has a coefficient of thermal expansion higher than that of the fiber;
   securing the optical fiber in the gripping region of the connector body;
   heating the connector to an elevated temperature to expand the optical fiber and the ferrule; and
   polishing the heated terminal end of the optical fiber flush to a heated end face of the ferrule.

2. The method of claim 1, wherein the connector is heated in an external oven.

3. The method of claim 1, wherein the heating the connector step comprises inserting the connector into a polishing apparatus and heating the polishing apparatus to an elevated temperature.

4. The method of claim 3, wherein the polishing apparatus includes a heatable platen and a heatable connector mount.

5. The method of claim 4, wherein the platen and connector mount are heated to a temperature greater than about 85° C.

6. The method of claim 4, wherein the platen and connector mount are heated to a temperature greater than about 110° C.

7. The method of claim 1, wherein the connector is polished on a heatable polishing platform.

8. The method of claim 1, wherein the connector is angle polished.

9. A polishing apparatus for polishing an optical fiber connector, the optical connector including a connector housing and a ferrule, comprising:
   a heatable connector mount to receive the optical fiber connector;
   a heatable platen supporting the connector mount; and
   a thermally insulating puck to hold the platen during polishing.

10. The polishing apparatus of claim 9, further comprising at least one thermocouple to monitor a temperature of the apparatus.

11. The polishing apparatus of claim 9, further comprising a power source coupled to the connector mount and platen.

12. The polishing apparatus of claim 9, where in the optical fiber connector is a remote grip optical fiber connector.

13. The polishing apparatus of claim 9, where in the optical fiber connector is a multi-fiber remote grip optical fiber connector.

14. The polishing apparatus of claim 9, wherein the heatable connector mount comprises a cylindrical shape configured to receive the ferrule with a snug, slideable fit.

15. The polishing apparatus of claim 14, further comprising a heating wire disposed on the heatable connector mount.

* * * * *

UNITED STATES PATENT AND TRADEMARK OFFICE
CERTIFICATE OF CORRECTION

| | |
|---|---|
| PATENT NO. | : 7,140,950 B1 |
| APPLICATION NO. | : 11/318987 |
| DATED | : November 28, 2006 |
| INVENTOR(S) | : James R. Bylander |

It is certified that error appears in the above-identified patent and that said Letters Patent is hereby corrected as shown below:

Title Page,
Item [56] References Cited, U.S. PATENT DOCUMENTS,
after "6,846,111" delete "B1" and insert -- B2 -- therefor.

Column 3,
Line 35, delete "1115" and insert -- 115 -- therefor.

Signed and Sealed this

Third Day of April, 2007

JON W. DUDAS
*Director of the United States Patent and Trademark Office*